United States Patent
Tajima et al.

[11] Patent Number: 6,105,666
[45] Date of Patent: Aug. 22, 2000

[54] VEHICULAR AIR CONDITIONING APPARATUS

[75] Inventors: Tadayoshi Tajima; Toshio Ohashi; Kaoru Kamiyama, all of Tochigi, Japan

[73] Assignee: Calsonic Corporation, Tokyo, Japan

[21] Appl. No.: 08/961,255

[22] Filed: Oct. 30, 1997

[51] Int. Cl.[7] .............................. F25B 29/00; B60H 1/00
[52] U.S. Cl. ..................... 165/202; 165/248; 165/249; 165/240; 237/2 B; 62/159; 62/173; 62/196.4; 62/180; 454/75
[58] Field of Search ................................ 165/248, 249, 165/202, 240; 237/12.3 A, 2 B; 454/75; 62/196.4, 173, 159, 180

[56] References Cited

U.S. PATENT DOCUMENTS

| | | | |
|---|---|---|---|
| 4,482,092 | 11/1984 | Biber et al. | 165/249 |
| 5,174,365 | 12/1992 | Noguchi et al. | 165/240 |
| 5,275,009 | 1/1994 | Kobayashi et al. | 62/228.3 |
| 5,291,941 | 3/1994 | Enomoto et al. | 165/62 |
| 5,299,631 | 4/1994 | Dauvergne | 165/240 |
| 5,355,689 | 10/1994 | Hara et al. | 62/196.4 |
| 5,419,149 | 5/1995 | Hara et al. | 62/196.4 |
| 5,477,700 | 12/1995 | Iio | 62/196.4 |
| 5,499,511 | 3/1996 | Hara et al. | 62/180 |
| 5,501,267 | 3/1996 | Iritani et al. | 165/241 |
| 5,505,251 | 4/1996 | Sarbach | 237/12.3 A |
| 5,598,887 | 2/1997 | Ikeda et al. | 62/196.4 |
| 5,706,664 | 1/1998 | Hara | 62/196.4 |
| 5,706,667 | 1/1998 | Iritami et al. | 165/248 |
| 5,769,316 | 6/1998 | Ikeda et al. | 237/2 B |
| 5,878,810 | 3/1999 | Saito et al. | 62/238.6 |

FOREIGN PATENT DOCUMENTS

| | | | |
|---|---|---|---|
| 0196456 | 8/1989 | Japan | 62/196.2 |
| 2-500677 | 3/1990 | Japan . | |
| 5-77636 | 3/1993 | Japan | 237/2 B |
| 5-157376 | 6/1993 | Japan | 237/2 B |
| 5-201243 | 8/1993 | Japan . | |
| 6-255348 | 9/1994 | Japan | 237/2 B |
| 7-101227 | 4/1995 | Japan . | |
| 7-132728 | 5/1995 | Japan . | |
| 8-295117 | 11/1996 | Japan . | |
| 9-109669 | 4/1997 | Japan . | |
| 2101286 | 1/1983 | United Kingdom | 62/196.2 |

OTHER PUBLICATIONS

"Patent Abstract of Japan" 59 143716 vol. 008, No. 274 (1984).
"Patent Abstract of Japan" 62 152915 vol. 011, No. 385 (1987).

*Primary Examiner*—John K. Ford
*Attorney, Agent, or Firm*—Foley & Lardner

[57] ABSTRACT

Described is an apparatus for air conditioning a passenger compartment of an automotive vehicle which achieves a quick warming-up of the passenger compartment. In the air conditioning apparatus, in addition to a coolant of a vehicular engine which is utilized as a heat source of a heater core, a highly compressed refrigerant discharged from a compressor can be utilized as a heat source of a sub condenser which is disposed in an air passage of the air conditioning apparatus, during the inside air warming up in the passenger compartment. During the warming up operation, the refrigerant discharged from the compressor is circulated through a bypass line bypassing a condenser disposed at a front part of an engine compartment and through the sub condenser and an evaporator.

2 Claims, 5 Drawing Sheets

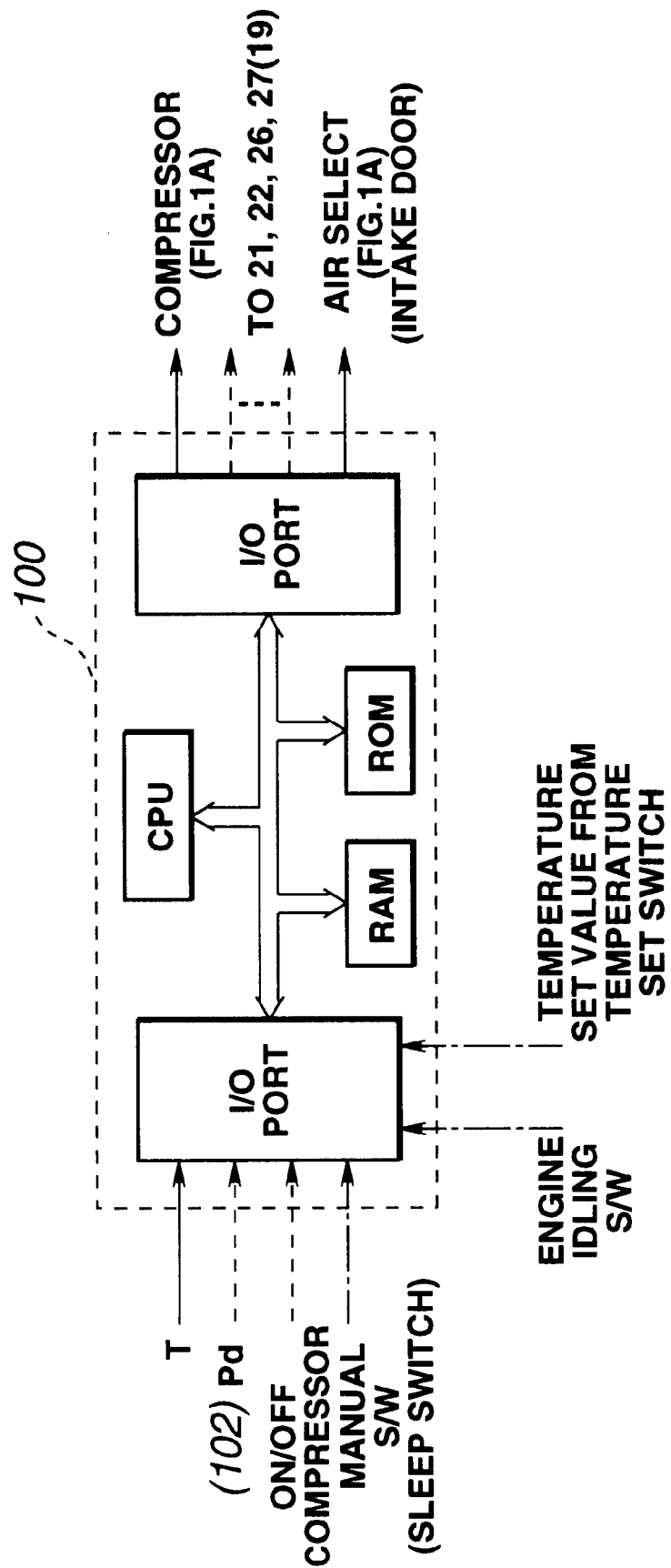

VEHICULAR AIR CONDITIONING APPARATUS

BACKGROUND OF THE INVENTION a) Field of the Invention

The present invention relates to a vehicular air conditioning apparatus having a quick warming-up performance using a plurality of heat sources.

b) Description of the Related Art

A previously proposed automotive air conditioning system is constituted by an air heating purpose coolant distribution line utilizing a vehicular engine coolant of a vehicular engine which is a driving source (a prime mover) of the vehicle as a heat source and by an air cooling purpose refrigerant distribution line utilizing a highly pressurized refrigerant discharged from a compressor as another heat source.

For example, referring to FIG. 4 the previously proposed vehicular air conditioning system is constituted by a) the coolant distribution line having an engine jacket 400, an electromagnetic valve 411, a piping member for performing a heat exchange between supplied engine coolant and introduced air (air introduced for the air conditioning purpose) to heat the introduced air at a heater core 406 and for returning the heat exchanged coolant to the engine jacket 400, and by b) the refrigerant distribution line having a compressor 401, an electromagnetic valve, a heat exchangeable condenser 402, a check valve 410, a liquid tank 403, an expansion valve 404, and a piping member for cooling or dehumidifying introduced air through an evaporator 405 and for returning the evaporator-passed refrigerant to the compressor 401.

In addition, the previously proposed automatic air conditioning system includes: an intake door 408 driven to be pivoted on its axle by means of an actuator 409 so as to selectively introduce inside air (I) in a passenger compartment or external air (E) external to the vehicle; and a fan of a blower 407.

Such a previously proposed vehicular air conditioning system as described above is exemplified by a Japanese Patent Application First Publication No. Heisei 9-109669 published on Apr. 28, 1997.

SUMMARY OF THE INVENTION

Unless a temperature of the engine coolant is raised, a temperature of the introduced air to be heated by means of the heater core is not accordingly raised. In other words, the air warming-up function of the previously proposed automotive air conditioning system is susceptible to a driving condition of the engine (i.e., dependent upon the driving condition of the vehicular engine).

In particular, in a case where the external air temperature is relatively low, and the engine has just started and/or a running load of the vehicle is light, the engine coolant temperature is not raised. As a result, a rise in temperature of the introduced air by means of the heat exchange in the heater core is insufficient. Consequently, it takes a considerably long time to raise the air temperature inside a passenger compartment up to a desired temperature. A driver or a vehicular occupant accordingly does not receive warm air for a long time. In addition, for example, if the engine is of a so-called lean burn type (a thin fuel-mixture ratio driven type), a thermal capacity of the engine coolant utilizable is inherently small. In this example, the above-described problem tends to become more pronounced.

Furthermore, a dehumidifying function during the warming-up drive mode is not provided in the previously proposed automotive air conditioning system. Hence, since moisture generated by the occupant(s) cannot be eliminated from the inside air of the passenger compartment, the external air (E) whose moisture content is lower than that of the inside air (I) is required to be introduced to dehumidify the inside air. Hence, energy efficiency becomes worsened since the low-temperature external air (E) is used as the introduced air through the intake door.

It is, therefore, an object of the present invention to provide a vehicular air conditioning apparatus having a quick (inside) air warming-up function and which is superior in an energy saving characteristic.

According to one aspect of the present invention, there is provided a vehicular air conditioning apparatus, comprising: an air passage into which an air is enabled to be sucked; an evaporator disposed in the air passage; a heater core disposed in the air passage at a downstream side with respect to the evaporator; a coolant water distributing line disposed so as to enable a circulation of an engine coolant of a vehicular engine through the heater core; a compressor; a heat-exchange enabling condenser; a refrigerant distributing line disposed so as to enable a circulation of a refrigerant discharged from the compressor through the condenser and the evaporator; a heat-exchange enabling sub condenser disposed in the air passage at a downstream side with respect to the evaporator and connected to the refrigerant distributing line in series with the condenser and the evaporator; a bypass line bypassing the condenser so as to enable a direct connection of the compressor with the sub condenser; a coolant temperature detector for detecting a coolant temperature of the engine coolant; a warm-up drive command generator for generating a warm-up drive command; and a controller, in response to the warm-up drive command, for introducing the refrigerant into the bypass line to circulate the refrigerant through the compressor, the bypass line, the sub condenser, and the evaporator on the basis of the detected coolant temperature and for selectively introducing an inside air of a passenger compartment into the air passage on the basis of the coolant temperature.

According to the present invention, since a highly compressed refrigerant discharged from the compressor can be utilized at the sub condenser as a heat source in addition to the engine coolant of the vehicular engine which is the running driving source during the warming-up drive mode, a quick rise in temperature of the introduced air (the air introduced for the air conditioning) can be achieved and the air temperature within the passenger compartment can be raised in a short period of time. In addition, since the dehumidification function during the warming-up drive mode is provided, it is not necessary to suppress a possibility of generating a mist (or cloud) on an inside surface of each windshield of the passenger compartment and the inside air having a high temperature than the outside air can be utilized as the introduced air.

BRIEF DESCRIPTION OF THE DRAWINGS

FIG. 1B is a schematic circuit block diagram of a controller of the vehicular air conditioning apparatus in the embodiment shown in FIG. 1A.

BEST MODE FOR CARRYING OUT THE INVENTION

Reference will hereinafter be made to the drawings in order to facilitate a better understanding of the present invention.

Figure 1A:
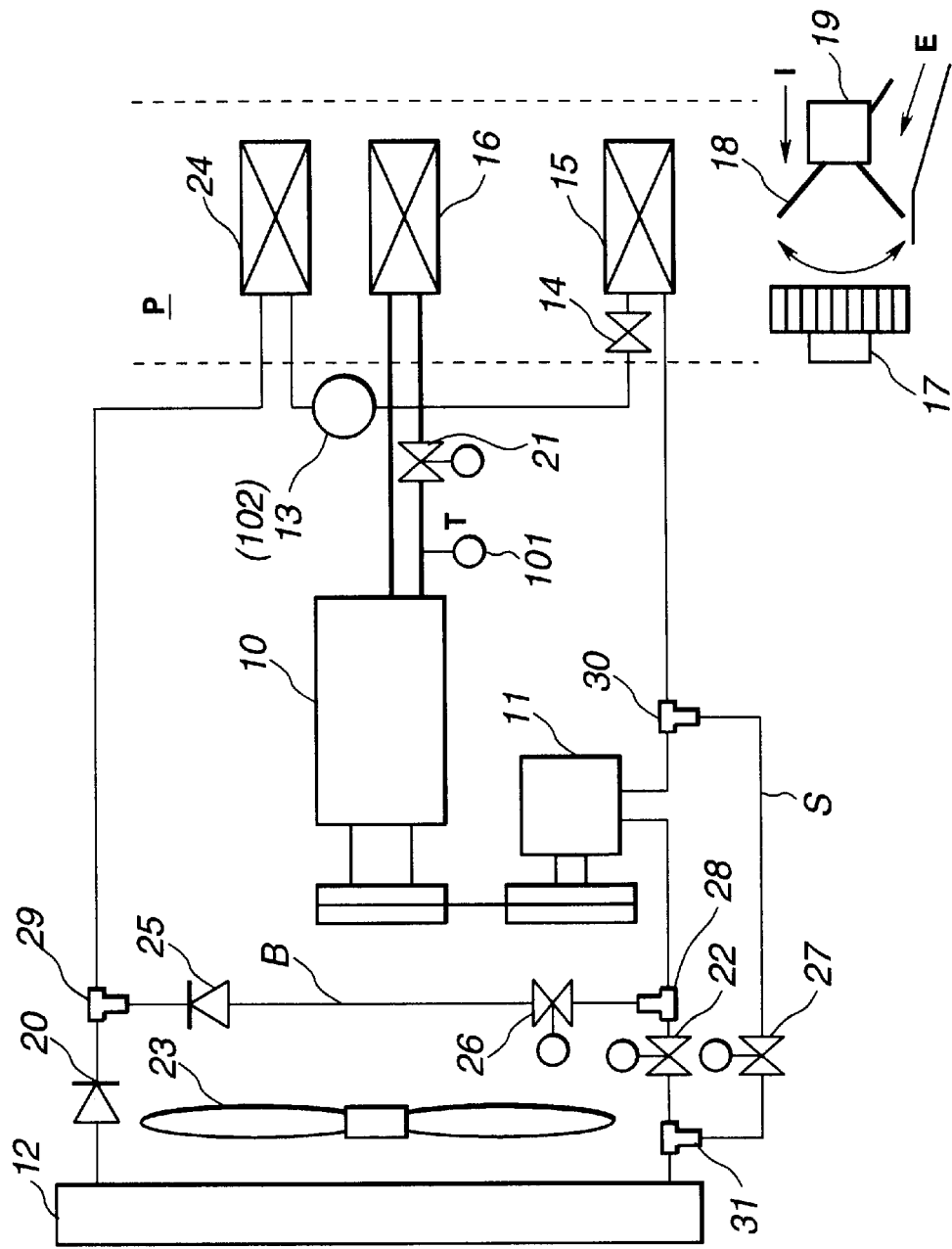
FIG. 1A is an overall schematic view of a preferred embodiment of a vehicular air conditioning apparatus according to the present invention.

FIG. 1A shows a preferred embodiment of a vehicular air conditioning apparatus according to the present invention.

FIG. 1B shows a schematic diagram of a controller of the vehicular air conditioning system.

In the vehicular air conditioning apparatus of the preferred embodiment shown in FIG. 1A, an evaporator 15 (most upstream side) having an expansion valve 14, a heater core 16, and a sub condenser 24 (most downstream side) are disposed in this sequence from an upstream side with respect to a blower fan 17 adjacent to an intake door 18 within an air passage P in which introduced air (air introduced for the air conditioning purpose) is streamed by means of the blower fan 17. On the other hand, the vehicle in which the air conditioning apparatus of the preferred embodiment is mounted includes an engine compartment in which a condenser 12 used to perform a heat exchange between a refrigerant passing through the condenser 12 of the air conditioning apparatus and outer air external to the air conditioning apparatus and a fan 23 used to promote the heat exchange in the condenser 23 are disposed at a front part of the engine compartment.

An actuator 19, for example, constituted by a DC motor, is disposed so as to drive the intake door 18 to be pivoted on its axle at either of two selected positions, thus the intake door 18 selectively introducing either inside (inner) air (I) or external (outer) air (E) into the air passage (P). The inside air (I) means air inside a passenger compartment particularly near to an inlet part of the air conditioning apparatus. The external air (E) means air outside the passenger compartment particularly from an external location with respect to the vehicle. The actuator 19 shown in FIG. 1A is connected to a controller 100 shown in FIG. 1B so that the intake door 18 is pivoted to select the introduced air according to a corresponding command issued from the controller 100 to the actuator 19.

An operation of the controller 100 will be described later.

In addition, the piping system of the vehicular air conditioning apparatus in the preferred embodiment includes a (high temperature) coolant distributing line for enabling a circulation of an engine coolant of an engine jacket 10 through the heater core 16 and refrigerant distributing lines (first, second, and third refrigerant lines) used to circulate the refrigerant discharged from a compressor 11 through the condenser 12 and/or the sub condenser 24.

The high temperature coolant distributing line includes a first piping member distributed from the engine jacket 10 to the heater core 16 and a second piping member distributed from the heater core 16 via an electromagnetic valve 21 to the engine jacket 10. A coolant temperature sensor 101 is disposed in either of the first or second piping members to detect the engine coolant temperature (T). It is noted that the coolant temperature sensor 101 may be disposed in the engine jacket 10.

The first refrigerant distributing line is a main line having a third piping member distributed from a discharge side of the compressor 11 to an intake side of the compressor 11 via an electromagnetic valve 22, the condenser 12, a check valve 20, the sub condenser 24, a liquid tank 13, the expansion valve 14, and the evaporator 15.

The second refrigerant distributing line B is a bypass line bypassing the condenser 12. The second refrigerant distributing line B includes a fourth piping member connecting a first three-way connector 28 located in a line between the compressor 11 and the electromagnetic valve 22 and a second three-way connector 29 located in a line between the check valve 20 and the sub condenser 24. The fourth piping member is provided with an electromagnetic valve 26 and a check valve 25.

The third refrigerant line S is a refrigerant collecting line S used to return a part of refrigerant resided in the condenser 12 to the intake (suction) side of the compressor 11. An electromagnetic valve 27 is disposed in the line S. A third three-way connector 30 and a fourth three-way connector 31 are used to form the third refrigerant distributing line S.

The controller 100, as shown in FIG. 1B, includes a microcomputer having a CPU, RAM, ROM, a common bus, and an I/O port.

The controller 100 receives input signals indicating, for example, an external air temperature (ambient temperature), a sunshine quantity, an inside air temperature of the passenger compartment (in-car temperature), a temperature set value set through a temperature switch by a vehicular occupant (this corresponds to a warm-up command generator for generating a warm-up command or a cool command generator for generating a cool command, these commands being determined according to the set temperature value), executes a calculation processing, and carries out automatically switchings of an outlet temperature, an outlet wind quantity, air inlets, and so forth. These functions of the controller 100 are exemplified by a U.S. Pat. No. 5,499,511 (the disclosure of which is herein incorporated by reference).

The controller 100 shown in FIG. 1B omits such input signals from corresponding sensors and output signals as described above and the controller 100 shown in FIG. 1B indicates only the input signals and output signals concerned with the embodiment shown in FIG. 1A.

Next, flows of the high temperature engine coolant in the coolant distributing line and of the refrigerant in the refrigerant distributing line will be described during the air warming-up drive mode (stage) of the air conditioning apparatus shown in FIGS. 1A and 1B.

First, the controller 100 receives the warm-up drive command from the temperature set switch.

In the high temperature coolant distributing line, the electromagnetic valve 21 is set to an "open" position (not shown) according to an open command signal derived from the controller 100.

While the electromagnetic valve 21 is open, the engine coolant supplied from the engine jacket 10 is introduced into the heater core 16 so that the introduced air passing the heater core 16 is heated.

On the other hand, since both electromagnetic valves 22 and 27 are set to "closed" positions according to close commands derived from the controller 100, the bypass line B (the second refrigerant distributing line) bypassing the condenser 12 functions. It is noted that before the warming-up stage, the third refrigerant distributing line S is enabled by the opened electromagnetic valve 27 so that the refrigerant resided in the condenser 12 is eliminated.

Hence, the highly compressed refrigerant of the high temperature and under a high pressure due to the compression thereof by means of the compressor 11 flows through the three-way connector 28 and bypasses the condenser 12 to be introduced into the sub condenser 24 via the electromagnetic valve 26, the check valve 25, and the three-way connector 29. The refrigerant in the sub condenser 24 is condensed and thermally radiated to perform the heat exchange to raise the introduced air passing the sub condenser 24.

Thereafter, a liquefied refrigerant passed through the liquid tank 13 is throttled in the expansion valve 14 and its pressure is relieved (reduced) by the expansion valve 14. Then, the throttled and relieved liquefied refrigerant is introduced into the evaporator 15 so as to absorb the heat of the introduced air to be evaporated. Consequently, the introduced air passing through the evaporator 15 is dehumidified (cooled). Thereafter, the refrigerant passes through the three-way connector 30 to reach into the compressor 11. The refrigerant is again compressed in the compressor 11.

A repetition of this cycle described above permits the warming up of the inside air in the passenger compartment due to energy added by means of the compressor 11.

As described above, in the vehicular air conditioning apparatus in the embodiment described above according to the present invention, in addition to utilizing the engine coolant of the vehicular engine which is the prime mover of the vehicle as the heat source of the heater core 16, the highly compressed refrigerant discharged from the compressor 11 can be utilized as the heat source of the sub condenser 24.

Hence, it is possible to improve a quick air-warming up performance of the vehicular air conditioning apparatus.

Even if the external air (E) is low, such as when the engine is at a so-called cold start (the engine has started under a considerably low ambient temperature (so that under a considerably low engine coolant temperature) or the vehicular running load is light, and a rising speed of the engine coolant temperature is slow, the temperature of the introduced air can quickly be raised. Since the temperature within the passenger compartment is raised in a very short period of time, it becomes more comfortable (pleasant) for the driver or passenger occupant(s).

In addition, since the refrigerant resided in the condenser 12 is eliminated before the start of the warming-up drive mode (stage), a reduction in the warming-up performance or a reduction of lubrication ability due to a lack in a circulation refrigerant quantity can be avoided. Consequently, a stable air warming-up drive of the vehicular air conditioning apparatus can be achieved.

Figure 2:
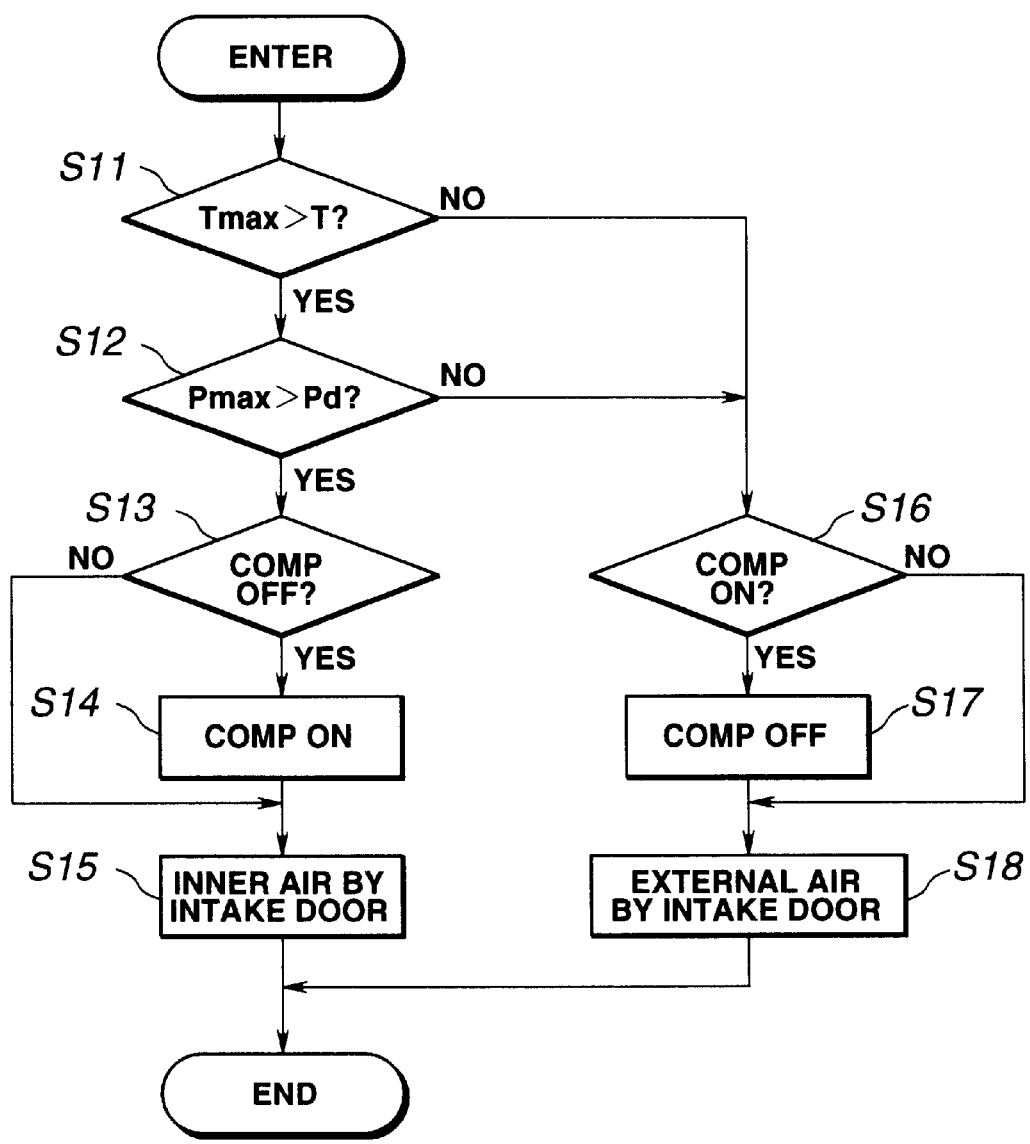
FIG. 2 is an operational flowchart for explaining an (inside) air warming-up drive mode executed in the controller shown in FIG. 1B.

FIG. 2 shows an example of an operational flowchart executed in the controller 100 (shown in FIG. 1B) in the warming-up drive mode.

First, at a step S11, in response to the warm-up drive command, the CPU of the controller 100 reads the engine coolant temperature T detected by the engine coolant temperature sensor 100 and compares it with a predetermined set (threshold) value Tmax, for example, 50° C. If T<Tmax at the step S11 (Yes), the routine goes to a step S12 in which the CPU reads a discharged refrigerant pressure Pd of the compressor 11 and compares it with a predetermined set value Pmax, for example, 23 Kg/cm². If Pd>Pmax (Yes), the routine goes to a step S13. If Pd≧Pmax (Pmax<Pd) at the step S12, the routine goes to a step S16. If T≧Tmax (No) at the step S11, the routine goes to the step S16.

At the step S13, the CPU of the controller 100 determines whether the compressor 11 is turned to OFF or to ON.

If the compressor 11 is turned to ON (NO) at the step S13, the routine goes to a step S15.

If the compressor 11 is turned to OFF at the step S13 (Yes), the routine goes to a step S14 in which the compressor 11 is turned to ON and goes to the step S15.

At the step S15, the CPU of the controller 100 issues a drive command to the actuator 19 to pivot the intake door 18 to be placed in a selected position so as to introduce the inside air (I) as the introduced air.

On the other hand, at the step S16, the CPU of the controller 100 determines whether the compressor 11 is turned to ON or turned to OFF. If the compressor 11 is turned to ON (Yes) at the step S16, the routine goes to a step S17 in which the compressor 11 is turned to OFF. If the compressor 11 is turned to OFF (NO) at the step S16, the routine goes to a step S18 in which the CPU of the controller 100 issues a drive command to pivot the intake door to another selected position so as to introduce the external air (E) as the introduced air.

Since the air conditioning apparatus provides the dehumidification function during the operation of the compressor 11, the inside air (I) is introduced in the air passage (P). If the engine coolant temperature is raised, it becomes possible to heat the introduced air only through the heater core 16. Hence, the compressor 11 is turned to OFF and the introduced air is the external air (E). Consequently, an energy efficiency is improved and an energy saving is achieved.

On the other hand, depending upon a driving situation of the vehicle, such a phenomenon that a cloud is developed on an inner surface of a front or side windshield of the vehicle is allowed to be admitted.

For example, suppose that a vehicular occupant takes a short nap in the passenger compartment during the engine idling. Hence, an exclusively-used switch (hereinafter, referred also to as a sleep switch) used for the vehicular occupant for forcefully setting the intake door to be placed at the selected position so as to introduce the intake air (I) as the introduced air during its turn to "ON" may be provided.

Figure 3:
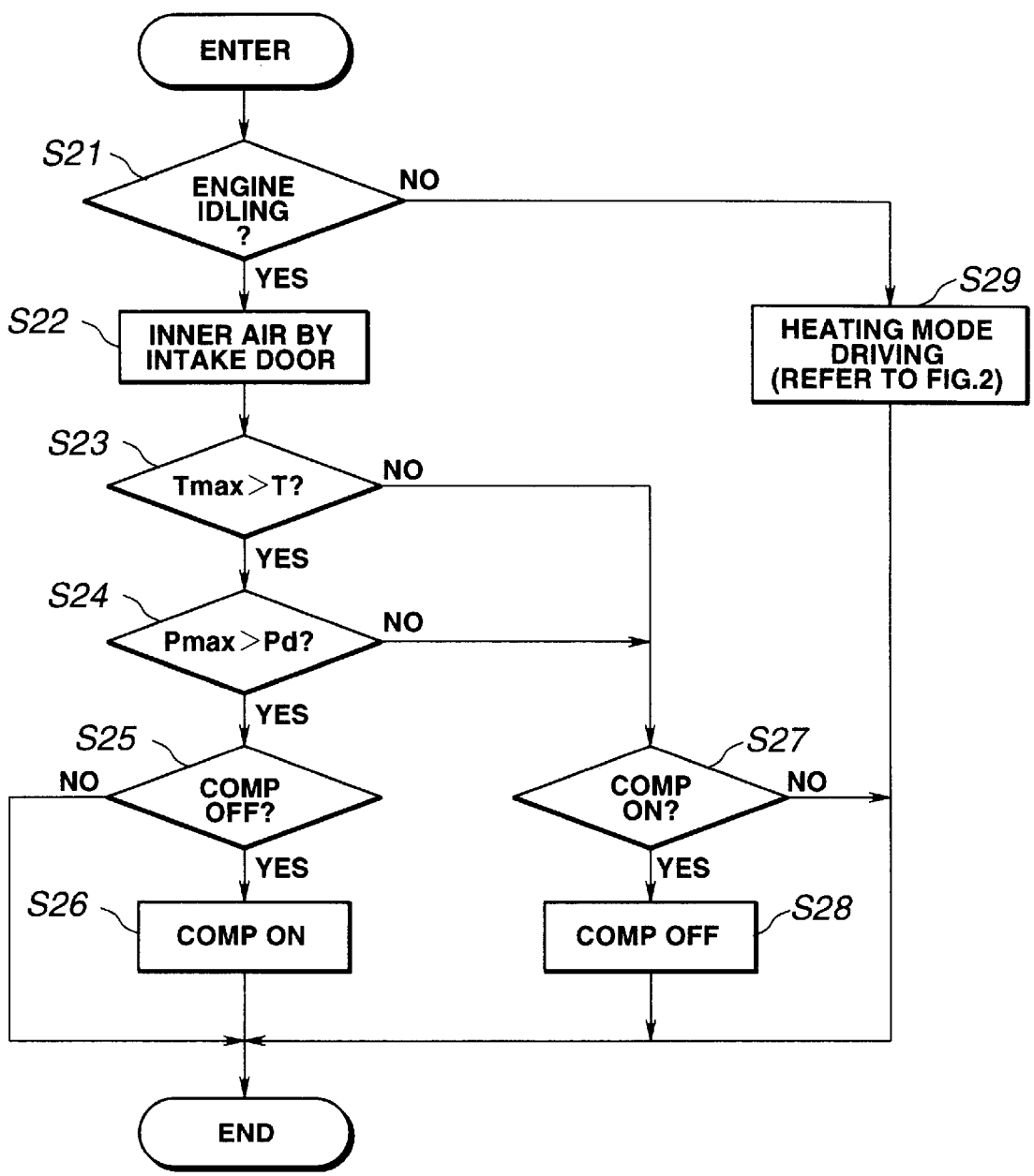
FIG. 3 is an operational flowchart for explaining an operation in the vehicular air conditioning apparatus shown in FIG. 1A particularly during an engine idling condition.
Figure 4:
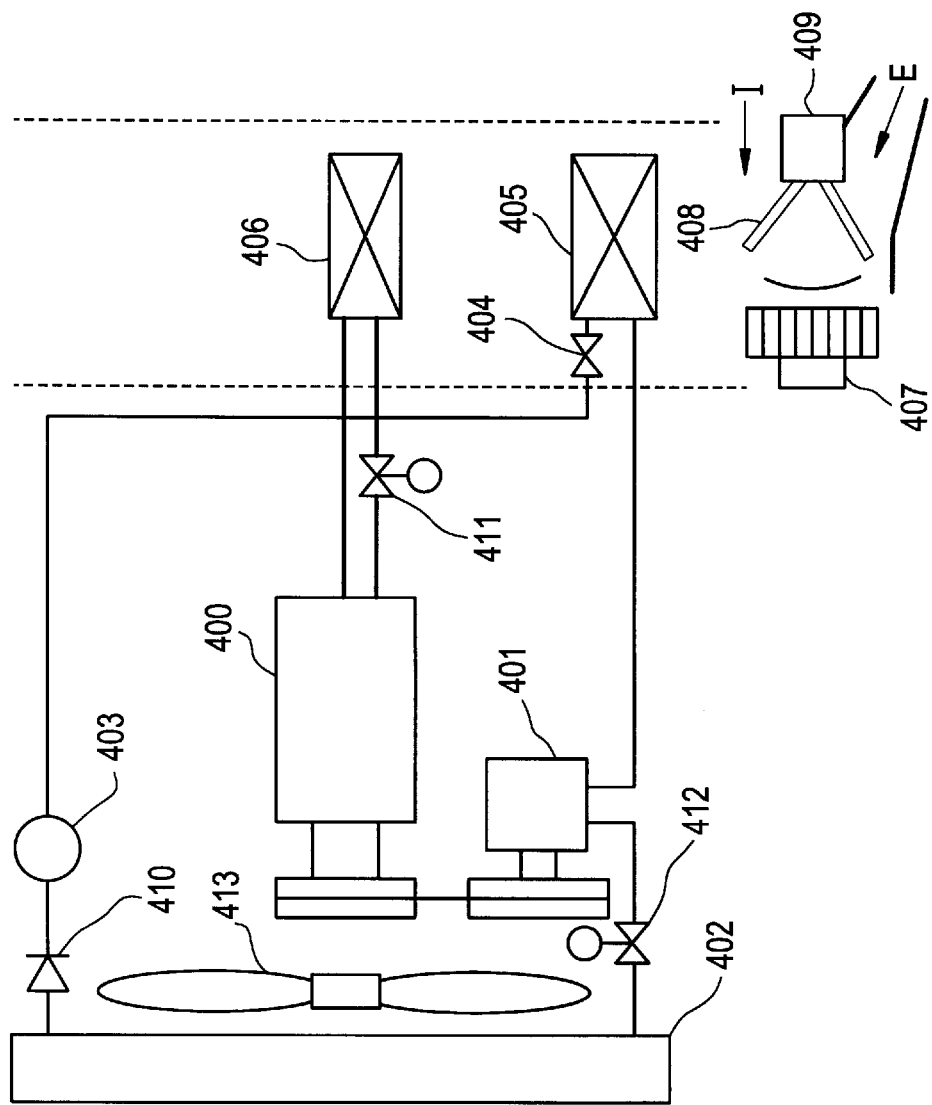
FIG. 4 is an overall schematic view of a conventional vehicular air conditioning apparatus.

FIG. 3 shows a control flowchart executed in the controller 100 when the engine idling occurs and the exclusively-used switch (sleep switch) is operated as described above.

First, at a step S21, the CPU of the controller 100 determines whether the engine falls within the engine idling according to an engine idling switch. It is noted that the confirmation of whether the engine falls in the engine idling condition may be carried out by another way although the controller 100 determines the engine idling when the engine idling switch is turned in the ON state.

When the CPU of the controller 100 determines that the engine falls within the idling condition (Yes) at a step S21, the routine goes to a step S22 in which the CPU of the controller 100 issues the drive command to the actuator 19 so that the intake door 18 is placed at the intake air (I) selected position. However, if the engine does not fall within the engine idling condition, the routine goes to a step S29.

Then, the routine goes to a step S23 in which the detected engine coolant temperature T is compared with the predetermined set (threshold) value Tmax.

If Tmax≦T at the step S29 (NO), the routine goes to a step S27 in which the CPU of the controller 100 determines whether the compressor 11 is turned to ON. It is noted that at the step S23 (Yes), the routine goes to a step S24. If Pd<Pmax (S24), the routine goes to a step S25.

It is noted that at the step S23 the CPU of the controller 100 issues the drive command to the actuator 19 so that the intake door 18 is pivoted at the selected position at which the inside air is selected to be introduced into the air passage (P).

If the compressor 11 is not turned to OFF at the step S25 (NO), the routine is ended. If the compressor 11 is turned to OFF (Yes) at the step S25, the routine goes to a step S26 in which the compressor 11 is turned to ON and the routine is ended.

If Tmax≦T at the step S23 (NO) or if Pmax≦Pd at the step S27 (NO) at the step S28, the routine goes to the step S27 in which the CPU of the controller 100 determines whether the compressor 11 is turned to OFF at the step S28.

If the compressor 11 is turned to OFF (NO) at the step S27, the routine is ended.

If the engine does not fall in the engine idling (NO) at the step S21, the routine goes to a step S29 in which the control flow shown in FIG. 2 is advanced.

In detail, since the intake door 18 is forcefully placed at the inside door selected position through the manual operation of the sleep switch, the introduced air is not changed to the outside air (E) even if the engine coolant temperature is raised. Hence, even if the driving situation which does not correspond to an automatic control through the controller 100 occurs, according to the determination by the vehicular occupant a flexible coping with the driving condition of the vehicle can be made. In addition, the reason that the CPU of the controller 100 determines the presence or absence of the idling driving at the step S21 is to prevent the erroneous operation during the running of the vehicle due to the vehicular occupant's failure to turn the sleep switch to OFF.

To reduce the apparatus manufacturing cost, it is desirable to use priority control means such as the sleep switch described above commonly with a control program or a control circuit of the controller 100 has modified.

Next, streams of the refrigerant and the high temperature coolant during a cooling drive of the air conditioning apparatus will be described with reference to FIG. 1A.

To reduce the apparatus manufacturing cost, it is desirable to use a priority control means such as the sleep switch commonly with the control program or circuit that the controller 100 has modified.

Next, the flows of the engine coolant in the coolant distributing line and the refrigerant in the refrigerant distributing line will be described below.

The controller 100 receives the temperature set value from the temperature set switch which is the cool drive command.

During the cooling drive mode, the electromagnetic valve 21 is closed so that the high temperature engine coolant distributing line is interrupted. Hence, the engine coolant in the engine jacket 10 is not introduced into the heater core 16 and the high temperature engine coolant distributing line shown in FIG. 1A does not function.

On the other hand, the electromagnetic valves 26 and 27 are closed in the second and third refrigerant distributing lines B and S. Hence, the first refrigerant distributing line passing through the condenser 12 outside the passenger compartment functions.

The refrigerant compressed by means of the compressor 11 passes through the electromagnetic valve 22 and the three-way connector 31 without bypassing the other second and third refrigerant lines of B and S through the three-way connector 28 to be introduced into the condenser 12 in which the heat exchange to the external air (E) is carried out.

Furthermore, the refrigerant in the condenser 12 is introduced to the liquid tank 13 via the check valve 20, the three-way connector 29, and the sub condenser 24.

Thus, the refrigerant passed through the liquid tank 13 is throttled via the expansion valve 14, its pressure thereof is reduced by the expansion valve 14 and is introduced into the evaporator 15. The refrigerant in the evaporator 15 is heat exchanged with the air passing through the evaporator 15 to cool (or dehumidify) the passing air. Then, the refrigerant passes through the three-way connector 30 to be introduced into the compressor 11 so as to be compressed again thereat.

The above-described cycle is repeated to perform the cooling inside the passenger compartment.

It is noted that, in the embodiment shown in FIG. 1A, the sub condenser 24 is located at the downstream side of the heater core 16 with respect to the air passage (P). Alternatively, the sub condenser 24 may be disposed in the air passage (P) between the evaporator 15 and the heater core 16.

It is noted that the discharged pressure of the refrigerant Pd from the compressor 11 is detected by means of a pressure sensor 102 located in the liquid tank 13.

It is also noted that, although not shown, a ventilator outlet, a foot outlet, and a defroster outlet are provided in the air passage (P) at the downstream side of the sub condenser 24 shown in FIG. 1A and these outlets, the compressor, and the blower fan are exemplified by the U.S. Pat. No. 5,499,511 issued on Mar. 19, 1996 (the disclosure of which is herein incorporated by reference). It is of course known to those skilled in the art that the blower fan 17 is connected to the controller 17.

What is claimed is:

1. A vehicular air conditioning apparatus, comprising:
   an air passage into which air is enabled to be passed therethrough;
   an evaporator disposed in the air passage;
   a heater core disposed in the air passage at a downstream side with respect to the evaporator;
   a coolant water distributing line disposed so as to enable a circulation of an engine coolant of a vehicular engine through the heater core;
   a compressor;
   a heat-exchange enabling condenser;
   a refrigerant distributing line disposed so as to enable a circulation of a refrigerant discharged from the compressor through the condenser and the evaporator;
   a heat-exchange enabling sub condenser disposed in the air passage at a downstream side with respect to the evaporator and connected to the refrigerant distributing line in series with the condenser and the evaporator;
   a bypass line bypassing the condenser so as to enable a direct connection of the compressor with the sub condenser;
   a coolant temperature detector detecting a coolant temperature of an engine coolant;
   a warm-up drive command generator generating a warm-up drive command to warm up a vehicular passenger compartment;
   a controller, in response to the warm-up drive command introducing the refrigerant into the bypass line to circulate the refrigerant through the compressor, the bypass line, the sub condenser, and the evaporator on the basis of the detected coolant temperature and for selectively introducing inside air of the vehicular passenger compartment into the air passage on the basis of the coolant temperature;
   a first electromagnetic valve disposed in the bypass line and a second electromagnetic valve disposed in the refrigerant distributing line at an upstream side with respect to the bypass line and wherein the controller, in response to the warm-up drive command, issues a close command to close the second electromagnetic valve and an open command to open the first electromagnetic valve so that the refrigerant discharged from the compressor is circulated through the bypass line, then through the sub condenser, and then through the evaporator;

a liquid tank disposed in the refrigerant distributing line at a downstream side with respect to the sub condenser and an expansion valve disposed in the refrigerant distributing line at an upstream side with respect to the evaporator; and a refrigerant collecting line distributed between an intake side of the compressor and one downstream end of the condenser for enabling a collection of a part of the refrigerant resided in the condenser into the compressor, wherein the bypass line is disposed in parallel to the condenser, the condenser being disposed in a front part of an engine compartment before a vehicular engine, and three-way connectors for the bypass line being connected in the refrigerant distributing line at both ends of the condenser, wherein, with respect to a blower fan, the sub condenser is disposed in the air passage downstream from the heater core and the heater core is disposed in the air passage downstream from the evaporator, the blower fan also being disposed in the air passage and enabling the air to be passed into the air passage downstream from the evaporator, the blower fan also being disposed in the air passage and enabling the air to be passed into the air passage, wherein the controller includes (i) a first determinator, the first determinator being responsive to the warm-up drive command from the warm-up drive command generator and determining whether the engine falls in an engine idling condition, and (ii) a second determinator, the second determinator being responsive to a determination that the engine falls in the engine idling condition and determining whether the detected coolant temperature T is lower than a predetermined set temperature value Tmax, wherein the controller determines whether a discharge refrigerant pressure (Pd) discharged from the compressor is lower than a predetermined discharge refrigerant pressure set value (Pdmax) when determining that the coolant temperature is lower than the predetermined discharge refrigerant pressure set value, wherein the controller further determines whether the compressor is operated when determining that the engine is in the idling condition and that the detected coolant temperature is lower than the predetermined set temperature value, wherein the controller turns on the compressor to operate the compressor when determining that the compressor is not operated and that the detected coolant temperature is lower than the predetermined set temperature value, to thereby provide an additional heating source to heat the vehicular passenger compartment, and wherein the controller turns off the compressor and issues a command to the actuator to pivot the intake door so as to selectively introduce external air outside the vehicle when determining that the engine is not in the idling condition and that the detected coolant temperature is equal to or greater than the predetermined set temperature value or when determining that the engine is not in the idling condition and that the discharge refrigerant pressure is equal to or greater than the predetermined discharge refrigerant pressure set value (Pdmax).

2. A vehicular air conditioning apparatus as claimed in claim 1, wherein the predetermined engine coolant value (Tmax) is approximately 50° C. and the predetermined discharge refrigerant pressure (Pmax) is approximately 23 Kg/cm$^2$.

* * * * *